Figure 1:
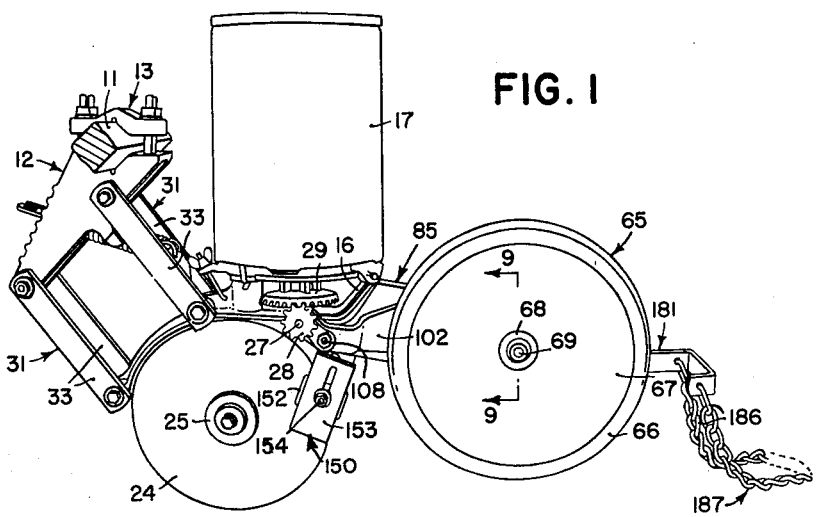

*INVENTORS.*
KNUD B. SORENSEN
ARTHUR J. BJERKAN

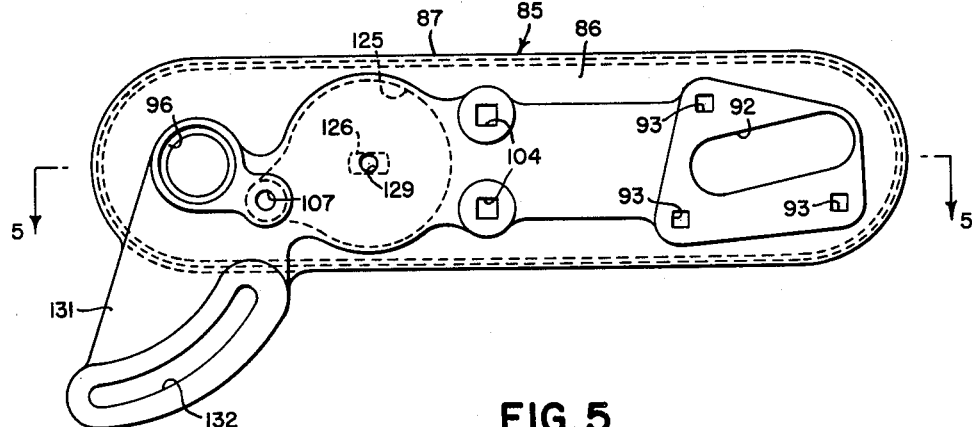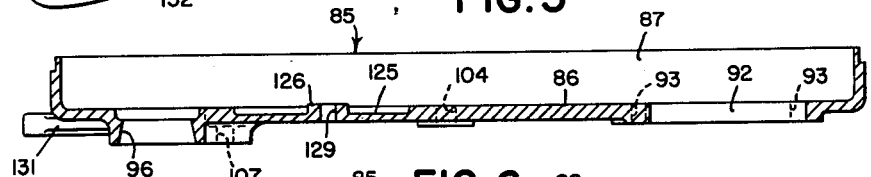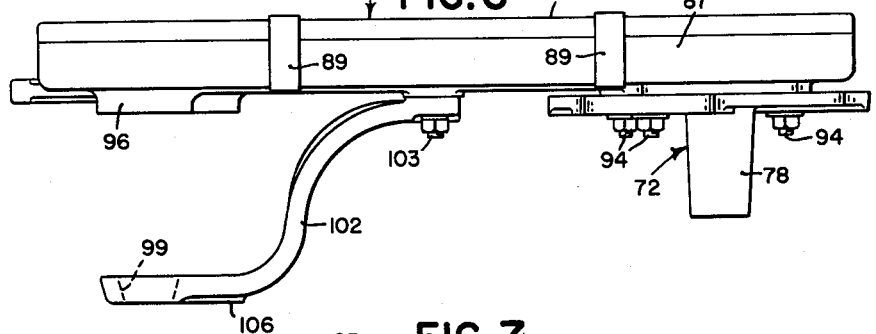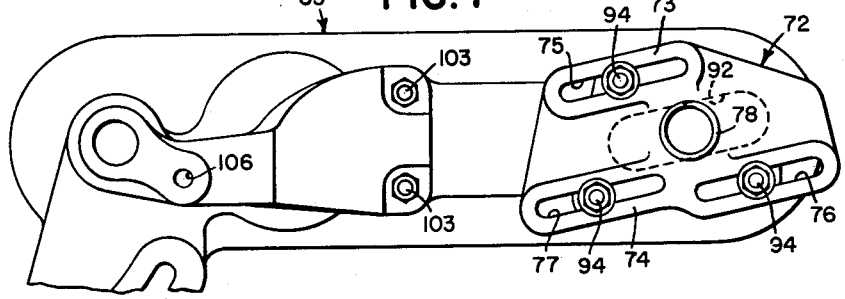
INVENTORS.
KNUD B. SORENSEN
ARTHUR J. BJERKAN
BY

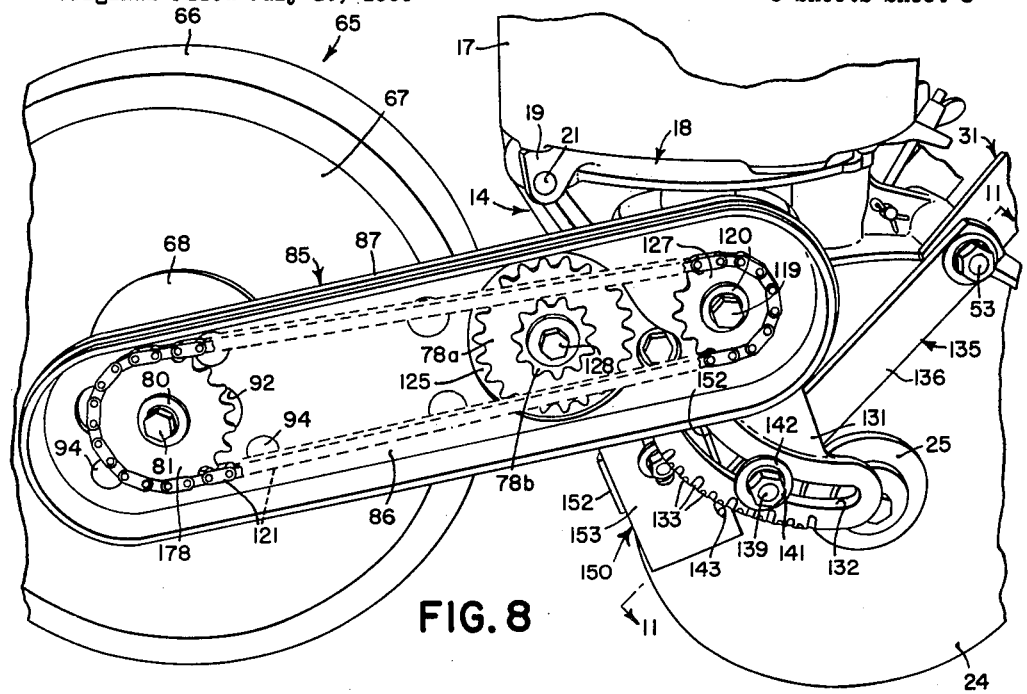
FIG. 8
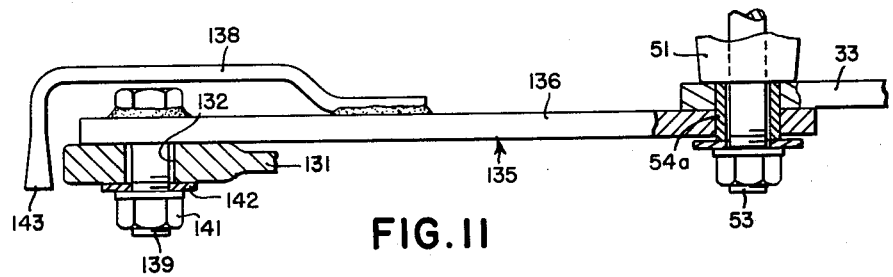
FIG. 11
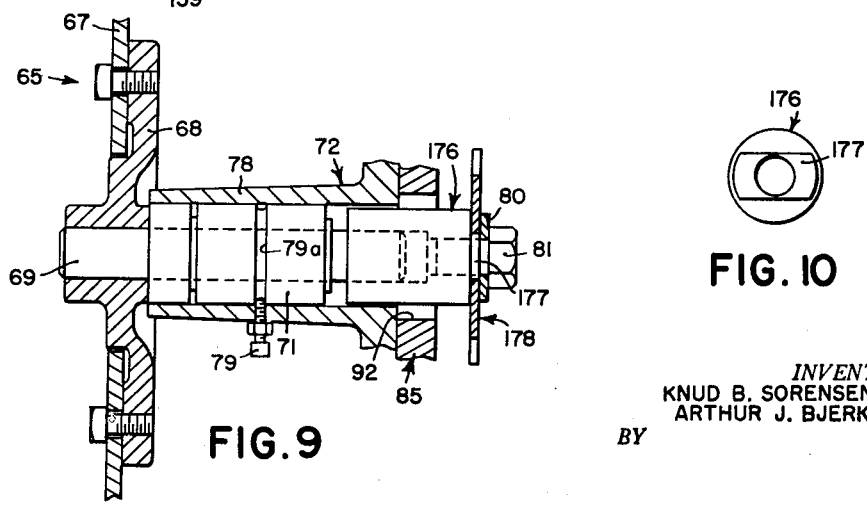
FIG. 9
FIG. 10
INVENTORS.
KNUD B. SORENSEN
ARTHUR J. BJERKAN
BY United States Patent Office 3,062,159
Patented Nov. 6, 1962

3,062,159
ADJUSTING MEANS FOR A VARIABLE
DRIVE PLANTER
Knud B. Sorensen, Waterloo, Iowa, and Arthur J.
Bjerkan, Moline, Ill., assignors to Deere & Company,
a corporation of Delaware
Original applications July 19, 1956, Ser. No. 598,854, now
Patent No. 3,022,754, dated Feb. 27, 1962, and Oct.
25, 1957, Ser. No. 692,415, now Patent No. 3,023,718,
dated Mar. 6, 1962. Divided and this application Nov.
25, 1959, Ser. No. 855,297
2 Claims. (Cl. 111—85)

This application is a division of our copending application, Ser. No. 598,854, filed July 19, 1956, for Unit Type Planter, now Patent No. 3,022,754, issued February 27, 1962, and our copending application, Ser. No. 692,415, filed October 25, 1957, for Unit Type Planter, now Patent No. 3,023,718, issued March 6, 1962.

The present invention relates generally to agricultural implements and more particularly to planting means of the unit type, of which a plurality of such units are usually attached to a transversely disposed toolbar or other support mounted on a tractor or the like.

The object and general nature of the present invention is a provision of a unit planter in which a press wheel is adjustably connected with the main body of the planting unit and is connected by suitable drive means so that the press wheel serves not only as a press wheel, mounted rearwardly of the seed dispensing means, but also as a depth determining means, and it is a further object of this invention to provide means whereby the press wheel drives the seed dispensing means through drive mechanism that is included in a housing that serves as an adjustable arm pivotally or movably connecting the press wheel with the seed boot and associated parts.

Another feature of this invention is a provision of new and improved drive means whereby, with a minimum of auxiliary parts and a minimum of handling, a substantial number of different drive ratios between the press wheel and the seed dispensing means is available. A further feature of this invention is the provision of means whereby changes in the drive ratio are accomplished through auxiliary sprockets, one or more of which are maintained readily available for use within the press wheel drive housing.

Still further, an additional feature of this invention is the provision of new and improved mounting means by which a seed boot and associated parts are connected with the toolbar or other support through mechanism that provides for an adjustable amount of down pressure, whereby to insure the desired penetration of the furrow opening means, and it is also a feature of this invention to provide new and improved spring means whereby the effective amount of down pressure may readily be adjusted by an operator without the use of any tools, levers or the like.

Another feature of this invention is the provision of adjusting means associated with the press wheel drive housing, whereby the position of the press wheel relative to the furrow opener boot may readily be made and the depth of operation secured thereby clearly indicated.

An additional feature of this invention is the provision of an implement support in the form of a rockable bar of an implement, such as a plurality of planting units, each having a furrow opener and a rigidly connected gauge wheel spaced from the furrow opener, each unit being connected through parallel links, whereby rocking of the toolbar serves to adjust the relationship between the gauge wheel and the associated furrow opener in all of the units.

Figure 2:
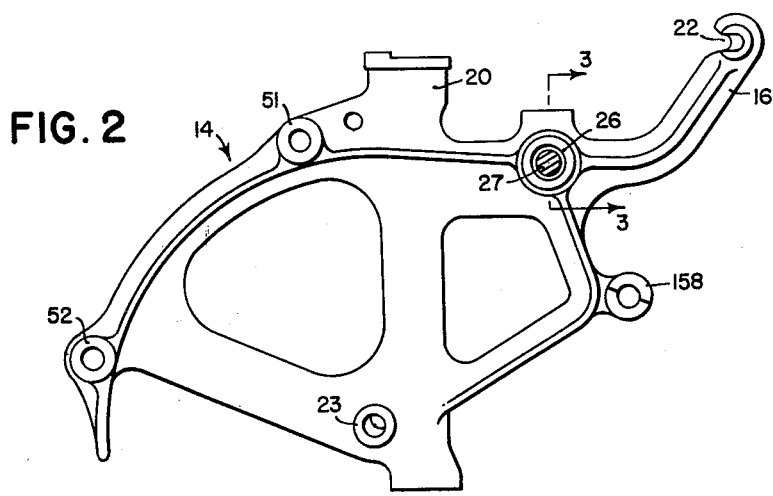
Figure 3:
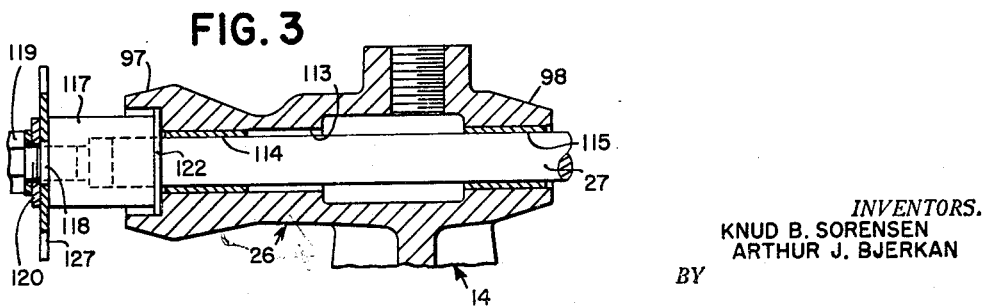

These and other objects and advantages of the present invention will be apparent to those skilled in the art after a consideration of the following detailed description, taken in conjunction with the accompanying drawings, in which:

FIG. 1 is a side view of the planter.
FIG. 2 is a side view of a portion of the hopper-supporting frame casting.
FIG. 3 is an enlarged section taken along the line 3—3 of FIG. 2.
FIG. 4 is a side view of the press wheel arm casting.
FIG. 5 is a sectional view taken along the line 5—5 of FIG. 4.
FIG. 6 is an edge view of the press wheel arm casting shown in FIG. 4, with additional parts added.
FIG. 7 is a side view of the press wheel arm casting, showing the same side as the side shown in FIG. 4, but with additional parts added.
FIG. 8 is a fragmentary perspective view showing the drive between the seeding shaft of the seed hopper and the press wheel shaft.
FIG. 9 is a sectional view taken through the press wheel, corresponding generally to a section taken along the line 9—9 of FIG. 1.
FIG. 10 is an end view of one of the sprocket-mounting parts.
FIG. 11 is a sectional view taken generally along the line 11—11 of FIG. 8.

Referring first to FIG. 1, the planting unit is shown as detachably mounted on a toolbar 11 that is square in cross section and conventionally is carried at the rear of the tractor for receiving a plurality of planting units. Preferably, the toolbar 11 is arranged on the tractor with the bar in a diagonal disposition, one edge of the bar being disposed in an uppermost position and the opposite edge in a lowermost position. The planting unit includes a mounting bracket 12 secured to the toolbar or support 11 by clamp means 13, and the planting means includes a furrow opener boot 14, preferably in the form of a casting having a rear extension 16 adapted to hingedly receive a hopper 17 in which conventional seed selecting means is disposed. Preferably, the hopper 17 includes a hopper bottom 18 having lugs 19 that are apertured to receive a hinge pin 21 that, when the hopper 17 is mounted in position on the furrow opener boot, is disposed in a notched opening 22 formed in the rear portion of the furrow opener boot extension 16. The latter also includes a lower bearing section 23 on which a pair of disk furrow openers 24 are mounted for rotation, as by conventional bearing means 25. A seed passageway 20 at the upper portion of the furrow opener boot 14 receives seed from the dispensing means of the hopper 17 and conducts the seed downwardly into the furrow opened by the disks 24. The furrow opener boot 14 also includes a transverse tubular section 26 in which a cross shaft 27 is disposed for rotation. At one end, the shaft 27 carries a pinion 28 that meshes with and drives a seeding gear 29 that, in turn, drives the seed dispensing means in the hopper 17. The means for driving the shaft 27 will be described below.

The furrow opener boot 14 and associated parts, including the hopper 17, are mounted for relatively free floating movement with respect to the support or toolbar 11 and to this end a pair of parallel links 31 are provided for swingably connecting the furrow opener boot 14 with the mounting bracket 12. Each of the link units 31 comprises a pair of spaced apart bars. To receive the rear portions of the parallel link units 31, the furrow opener boot 14 is provided with upper and lower transverse tubular extensions 51 and 52 by which pivot bolt means 53, extending through the rear apertured ends of the upper and lower links 33 swingably mount the furrow opener boot 14 and associated parts on the upper or lower ends of the parallel link units 31.

According to the principles of the present invention, the press wheel, which is indicated in its entirety by the reference numeral 65, is employed, not only to firm the soil about the planted seed, but also to determine or control the depth of operation and, additionally, to drive the seed dispensing means that forms a part of the planting unit. The press wheel 65 includes a rubber or flexible tread section 66, a web section 67, and a hub section 68 that is secured in any suitable way, as by a press fit, to one end of a press wheel shaft 69 (FIG. 9) that is journaled for rotation in a press wheel bracket 72. The latter comprises a plate-like structure having upper and lower slotted portions 73 and 74 (FIGS. 6 and 7) formed with slots 75, 76 and 77, and a generally centrally disposed tubular sleeve section 78 that receives the outer race of the bearing means 71, the outer race being secured in the tubular bracket section 78 by a set screw 79 that extends into a groove 79a formed in the outer bearing race. The bearing means and other parts are so constructed and arranged that the shaft 69 is held in the bracket 72 against lateral displacement. The end of the shaft 69 opposite the press wheel hub 68 carries, as by a press fit, a drive sprocket hub 176 that is of special construction, having at its outer end a generally oblong non-circular lug 177 that is adapted to receive an associated sprocket 178 that is substantially flat, as shown in FIG. 9, having a central aperture that fits non-rotatably over the lug 177. The lug portion 177 of the sprocket hub 176 is tapped and threaded to receive a cap screw 81 that with associated washer 80 serves to hold the sprocket 178 onto the shaft 69, but by removing the cap screw 81 and associated washer 80, the sprocket 178 may be removed and replaced by other sprockets, such as one of the sprockets shown at 78a and 78b (FIG. 8), for example, reference to which will be made in more detail below.

The press wheel 65 is adjustably connected with the furrow opener boot 14 by adjustable support or arm member 85 that, according to the present invention, is shiftable in concentric relation with respect to the seeding mechanism drive shaft 27. The support 85 preferably takes the form of a rigid generally longitudinally extending chain drive housing having a back wall 86 and a continuous flange 87 forming side walls to which a housing cover 88 is adapted to be fixed, as by spring fasteners 89. The rear or outer end of the chain drive housing 85 is formed with a generally fore-and-aft extending slot 92 through which the press wheel shaft 69 and associated sprocket hub 176 are adapted to extend. This portion of the chain drive housing is also provided with three openings 93 to non-rotatably receive the head portions of connecting bolts 94 that extend through the openings 93 and the associated slots 75, 76 and 77 in the press wheel bracket 72. The slots 75—77 and 92 are of substantial length so that when the bolts 94 are loosened, the press wheel and its bracket may be adjusted generally longitudinally of the drive housing or press wheel arm 85. The purpose of this arrangement will be referred to below.

The forward portion of the chain drive housing or press wheel supporting arm 85 is provided with a conically apertured section 96 (FIG. 5) in the back wall 86 of a housing, and this portion of the drive housing is rockably mounted on a complementarily tapered end portion 97 of the tubular boss or sleeve section 26 formed on the furrow opener boot casting 14. The opposite end of the transverse boot section 26 is also tapered, as indicated at 98, and this portion is received in a conical opening 99 (FIG. 6) formed on the forward end of a housing brace 102, the opposite end of which is extended vertically and apertured to receive a pair of clamping bolts 103 that extend through openings 104 formed in the back wall of the drive housing 85 and fix the brace 102 to the housing 85 in such position that the conical opening 99 of the brace is in coaxial or aligned relation with respect to the tapered or conical opening 96 in the forward end of the drive housing. A portion of the drive housing brace 102 and the back wall of the housing 85 are apertured, as at 106 and 107 respectively, to receive a tightening bolt 108 (FIG. 1) which, when tightened, brings and holds the associated tapered surfaces into close fitting relation whereby the press wheel 65 is rigidly connected with the associated furrow opening boot 14, although the arm or drive housing 85 may be swung in a generally vertical direction to adjust the positon of the press wheel relative to the associated furrow opennig boot. The seeding drive shaft 27 is disposed for rotation in the tubular section 26 of the boot member 14 (FIG. 3), the boot extension 26 having a shaft receiving opening 113 therein and in which cylindrical bearing members 114 and 115 are disposed. At one end, the shaft 27 receives the pinion 28 that drives the seeding gear 29 mentioned above. At the other end, the shaft 27 is threaded and receives a driven sprocket hub 117 that is provided with an oblong extension or lug 118 dimensionally identical with the lug 177 on the drive hub 176 that is fixed to the press wheel shaft 69. Thus, any sprocket that can be attached to the drive hub 176 may also be mounted on the driven sprocket hub 117. The latter is formed with a central opening that permits attachment to the seeding drive shaft 27 and which is tapped to receive a cap screw 119 that, with a washer 120, secures a sprocket 127 to the shaft 27. A drive chain 121 is trained over the sprockets fixed to the press wheel shaft and the seeding shaft and forms means whereby rotation of the press wheel serves to drive the seeding mechanism. A thrust washer 122 is disposed between the inner end of the hub 117 and the adjacent portion of the tubular section 26.

Reference was made above to the feature of the present invention wherein different sprockets may be mounted on the press wheel shaft and seeding shafts to provide different drive ratios. To the end of providing for a considerable number of permissible ratios, the back wall 86 of the drive housing is provided with a shallow recess 125 in the generally central portion which a stud 126 is provided, the stud being oblong and corresponding substantially identically to the shape of the lugs 177 and 118 described above, except that the housing lug 126 is somewhat longer, whereby this lug is adapted to receive two auxiliary sprockets 78a and 78b (FIG. 8) so as to have them available for substitution for either the sprocket 178 on the press wheel shaft or the sprocket 127 on the seeding shaft. A cap screw 128 is screwed into a threaded opening 129 formed in the central portion of the stud 126 for the purpose of holding the auxiliary sprockets 78a and 78b in the housing 85. Where different diameter sprockets are substituted it is necessary to make a corresponding adjustment in the drive chain 121, and to that end all that it is necessary to do is to loosen the bolts 94 and shift the press wheel bracket 72 to a position in which the drive chain 121 has the requisite tightness, and then tightening the bolts 94. Since, as best shown in FIG. 8, the drive housing 85, mounting the press wheel 65 on the furrow opener boot, is for most operating positions disposed at a slight angle to the horizontal, the slot 92 that is formed in the back wall at the rear portion of the drive housing 85 lies at a slight angle to the longitudinal axis of the member 85, thus disposing the slot in a position generally parallel to the ground surface. This is for the purpose of minimizing any variations in the depth of operation when different sprockets are substituted for effecting a change in the drive ratio.

The depth of operation is determined by the position of the press wheel 65 and the member 85 that connects the press wheel with the furrow opener boot. New and improved means is provided for making the depth adjustment, when necessary, and to this end an adjustable connection between the drive housing 85 and the furrow opener boot is provided. An arcuate extension 131 is formed on or carried by the housing member 85 and is provided with a slot 132 on which is formed, on the outer side thereof, a number of substantially equally spaced depth indicating graduations 133. Cooperating with the arcuate extension 131 is a combined link and pointer indicated generally at 135, this member comprising a link member 136 apertured at one end to fit over the bolt or pivot means 53 that connects the rear portion of the upper parallel link unit with the adjacent portion of the furrow opener boot 14. The other end of the link 136 carries a pointer element 138 (FIG. 11) that is fixed to the inner side of the link 136, extending over the head of a cap screw 139 that at its threaded end extends through the slot 132, receiving a nut 141 and washer 142 disposed at the outer side of the slotted extension 131 on the drive housing 85. The screw 139 is shifted into different positions in slot 132, and when so shifted, the arm member 85 is disposed in different angular positions about its axis of pivotal or swinging connection with the boot castings 14. The length of the link 136 and the disposition and configuration of the slot 132 are such that for uniform increments of change in the depth of operation, the pointer element 138, particularly the outer flattened end 143 thereof, shifts generally uniformly along the graduated portion 133 of the arcuate sector 131. Preferably, the parts are so arranged that the movement of the pointer for a given change in the depth of operation is dimensionally the same as the actual change in planting depth. Tightening the nut 141 secures the housing 85 in the desired position and thus provides uniform planting at the desired depth. The arm 136 swings on the associated bushing 54a.

During the aforesaid adjustments the arm 85 swings about an axis that coincides with the axis of the shaft 27, and hence, when such adjustments are made the sprocket and chain drive connections are not affected in any way.

Cooperating with the furrow opening disks 24 is a scraper means indicated in its entirety by reference numeral 150. Such means includes a scraper support 152 on which a scraper blade 153 is disposed. The blade is a simple flat plate having an opening to receive an attaching bolt 154 that extends through an opening in the associated scraper support. To receive the scraper support 152, the furrow opener boot, adjacent the rear portion thereof, carries a transversely disposed sleeve-like lug.

Under certain soil conditions, and where otherwise desired, it may be necessary or advisable to provide a covering chain for dragging loose soil over the packed-down area behind the press wheels 65. To this end, we provide the covering chain bracket 181 which is apertured to receive the hook or attaching members 186 that are secured to and form the end portions of a covering chain 187. The latter is of such length that in operation the covering chain trails along the ground rearwardly of the associated press wheel and brings loose soil over the press wheel track.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a planting unit, the combination of a press wheel shaft, a furrow opener boot carrying seed dispensing means and a shaft to be driven for actuating said dispensing means, a drive housing having two ends, openings in said drive housing, one adjacent each end, to receive the adjacent ends of said shafts, drive means disposed within said housing and connecting said shafts, said housing being adapted to rotate about the axis of said driven shaft, means connected to said housing normally disposing said housing at an angle to a horizontal plane the end of said housing receiving said press wheel shaft having a slotted portion in which said press wheel shaft is shiftably received, and means interconnecting said press wheel shaft and said housing to adjustably mount said press wheel shaft in different positions of adjustment along said slotted portion, the longitudinal axis of the slot in said portion being disposed at an angle, equal to the above mentioned angle, to the longitudinal axis of said housing and so arranged as to be in a substantially horizontal plane when the housing is in its normal position, whereby fore-and-aft adjustment between the housing and said press wheel shaft does not materially affect the depth of operation.

2. The invention set forth in claim 1, further characterized by said press wheel shaft mounting means comprising bracket means having a sleeve section, in which the press wheel shaft is disposed for rotation, and a slotted plate-like portion adapted to be adjustably fixed to the drive housing, and fastener means carried by the drive housing and extending through the slot means in said plate-like bracket portion for adjustably fixing said bracket means to said housing.

References Cited in the file of this patent

UNITED STATES PATENTS

| | | |
|---|---|---|
| 414,419 | Lindsley | Nov. 5, 1889 |
| 1,635,866 | Townsend | July 12, 1927 |
| 1,902,924 | Wamhoff | Mar. 28, 1933 |
| 2,745,330 | Nelson | May 15, 1956 |
| 2,774,318 | Johnson | Dec. 18, 1956 |
| 2,789,736 | Agnoletto | Apr. 23, 1957 |
| 2,955,550 | Downey | Oct. 11, 1960 |

FOREIGN PATENTS

| | | |
|---|---|---|
| 745,203 | Great Britain | Feb. 22, 1956 |